United States Patent
Eichholz et al.

(10) Patent No.: US 8,620,331 B1
(45) Date of Patent: Dec. 31, 2013

(54) WIRED SERVICE FOR WIRELESS SUBSCRIBERS

(75) Inventors: Kathy Eichholz, Leawood, KS (US); Brent Joseph Larzalere, Olathe, KS (US); Diana P. Hoppe, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 418 days.

(21) Appl. No.: 12/949,281

(22) Filed: Nov. 18, 2010

(51) Int. Cl.
*H04W 40/00* (2009.01)

(52) U.S. Cl.
USPC ............ 455/445; 455/435.1; 455/414.1; 455/426.1; 455/461; 455/456.2; 455/411; 455/436; 370/331; 370/338; 370/328; 370/356; 379/93.05; 379/93.06; 379/93.07

(58) Field of Classification Search
None
See application file for complete search history.

(56) References Cited

U.S. PATENT DOCUMENTS

| | | | | |
|---|---|---|---|---|
| 6,208,854 | B1* | 3/2001 | Roberts et al. | 455/417 |
| 8,169,951 | B1* | 5/2012 | Mangal | 370/328 |
| 8,249,604 | B2* | 8/2012 | Abichandani et al. | 455/445 |
| 8,306,197 | B1* | 11/2012 | Turner | 379/93.05 |
| 2005/0152343 | A1* | 7/2005 | Rajagopalan | 370/352 |

\* cited by examiner

*Primary Examiner* — Charles Appiah
*Assistant Examiner* — Randy Peaches (57) ABSTRACT

Methods and systems for establishing landline telephone services for wireless telephone subscribers are provided. One embodiment of a method includes receiving a request to establish a voice connection between a first telephone device and a second telephone device, wherein the second telephone device is a landline telephone device, and further wherein a particular wireless telephone number is associated with the second telephone device; referencing a mapping of one or more wireless telephone numbers and corresponding IP addresses, wherein the particular wireless telephone number associated with the second telephone device is mapped to a particular IP address in the referenced mapping; and utilizing said referenced mapping, initiating a voice connection between the first telephone device and the second telephone device.

19 Claims, 5 Drawing Sheets

WIRED SERVICE FOR WIRELESS SUBSCRIBERS

SUMMARY

Embodiments of our technology are defined by the claims below, not this summary. A high-level overview of various aspects of our technology are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to provide landline telephone to a wireless-telecommunications-network subscriber.

BRIEF DESCRIPTION OF THE SEVERAL VIEWS OF THE DRAWINGS

Illustrative embodiments of the our technology are described in detail below with reference to the attached drawing figures, wherein.

DETAILED DESCRIPTION

The subject matter of the present technology is described with specificity herein to meet statutory requirements. However, the description itself is not intended to define what we regard as our invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps disclosed herein, unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present technology. The following is a list of these acronyms:

| | |
|---|---|
| ATA | Analog Telephone Adapter |
| BTS | Base Transceiver Station |
| CDR | Call Detail Record and/or Call Data Record |
| IP Address | Internet Protocol Address |
| MAC Address | Media Access Control Address |
| PSTN | Public Switched Telephone Network |
| SDP | Service-delivery platform |
| UMTS | Universal Mobile Telecommunications System |
| VoIP | Voice over Internet Protocol |
| WLAN | Wireless Local Area Network |
| WT Network | Wireless Telephone/Telecommunications Number |
| WTN | Wireless Telephone/Telecommunications Number |

Further, various technical terms are used throughout this description. An illustrative resource that fleshes out various aspects of these terms can be found in Newton's Telecom Dictionary by H. Newton, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
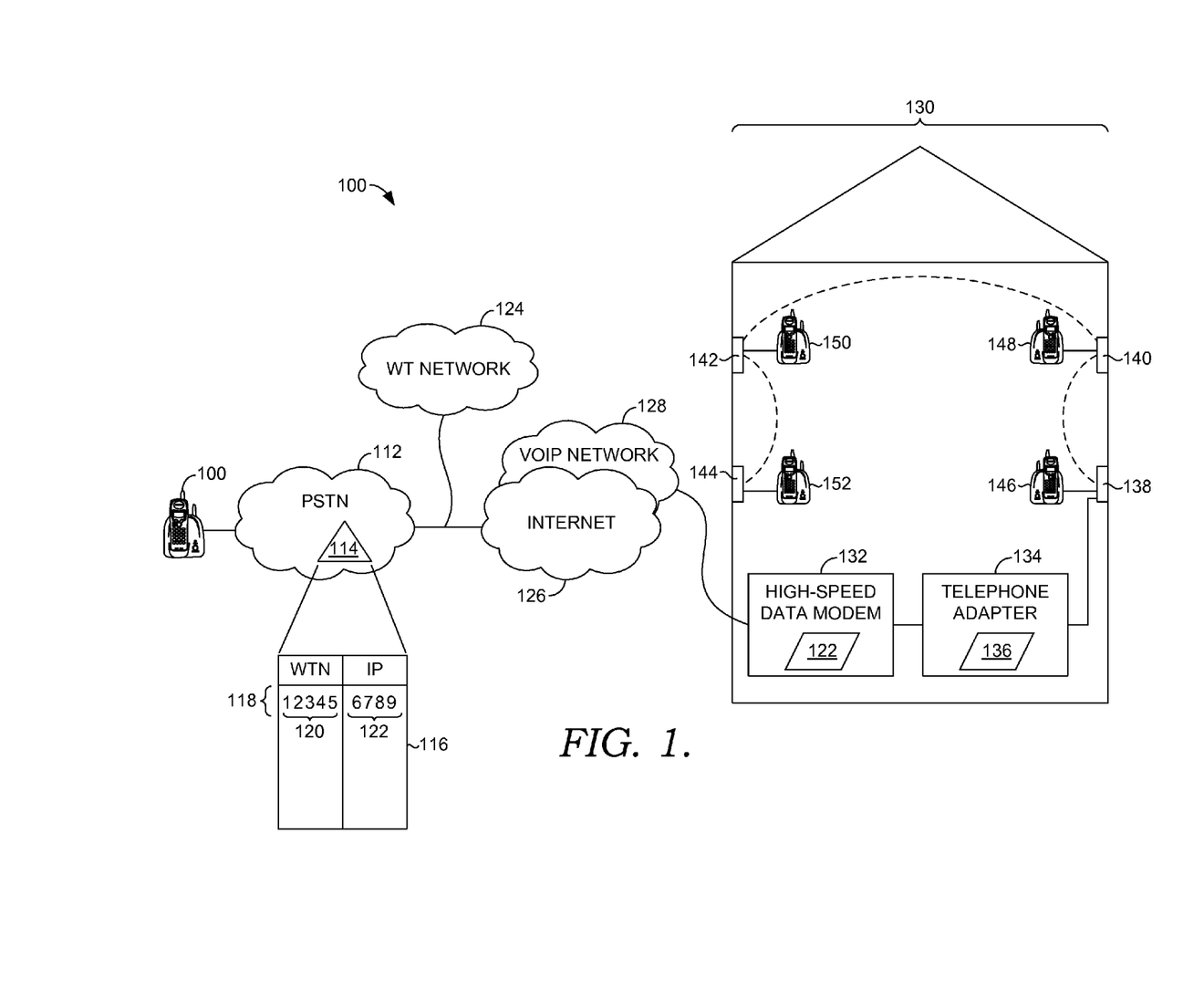
FIGS. 1-3 depict illustrative operating environments suitable for practicing embodiments of our technology.

Turning now to FIG. 1, an illustrative operating environment suitable for practicing an embodiment of our technology is provided and referenced generally by the numeral 100. Although some components are shown in the singular, they may be plural. For example, operating environment 100 might include multiple networks or switches, etc. As illustratively shown, operating environment 100 includes a first communication device 110 (which might variously be referred to herein as a first device, a communication device, a telephone device, a telephone, or just device depending on readability). First device 110 is shown coupled to PSTN 112. As such, first device 110 is any device that is capable of communicating either directly or indirectly with PSTN 112. For example, first device 110 may any type of telecommunications device, such as a landline telephone device, that is in direct or indirect communication with the PSTN 112.

PSTN 112 includes a switch 114. Although switch 114 is depicted within the PSTN 112, switch 114 might reside outside the PSTN 112, reside in the internet 126, or reside in another location in the operating environment 100. Switch 114 may be an analog switch, a digital switch, or a combination of both analog and digital components that perform the functionality of switch 114. In association with the switch 114 is a mapping 116 that maps wireless telephone numbers to IP addresses. As shown in mapping 116, an exemplary mapped pair 118 is depicted with wireless telephone number 120 mapped to IP address 122. For example, a wireless telephone number of "(123) 456-7890" could be mapped to and/or paired with an IP address of "123.45.678.9101" in mapping 116. In one embodiment, a single wireless telephone number is mapped to a single IP address. For example, the particular wireless telephone number 120 is mapped to a single, particular IP address 122 in mapping 116.

As shown in FIG. 1, the PSTN 112 is coupled to wireless telecommunications network 124. As will be understood, in some embodiments, the wireless network 124 may be separated from or integrated with the PSTN 112. The PSTN 112 is also shown coupled to the internet 126, which is also coupled to the VoIP network 128. Although illustratively shown as a subset of the internet 126, in some situations, the VoIP network 128 transcends and/or extends beyond the Internet 126. VoIP network 128 might even be a private network, independent of the internet 126, or conversely may be integrated into and subsumed within the internet 126.

The VoIP network 128 is also shown coupled to a customer site 130. Customer site 130 includes a high-speed data modem 132 coupled to a telephone adapter 134. High-speed data modem 132 includes an IP address 122. Additionally, telephone adapter 134 is associated with a certain MAC address 136. In one embodiment, mapping 116 includes MAC address 136, in addition to wireless telephone number 120 and IP Address 122. Although depicted as separate components, high-speed data modem 132 and telephone adapter 134 might be combined into a single component. For example, a single VoIP ATA device may perform the functions of both the high-speed data modem 132 and the telephone adapter 134.

As part of customer site 130, telephone adapter 134 is shown coupled to landline telephone jack 138. Based on the connection between telephone adapter 134 and landline telephone jack 138, landline telephone jacks 140, 142 and 144 are also coupled to landline telephone jack 138. A telephone connection may therefore be established via any one of landline telephone jacks 138, 140, 142, and 144. In other words, landline telephone jacks 140, 142, and 144 are made active ("lit up" in the vernacular of some artisans) by virtue of the connection between telephone adapter 134 and landline telephone jack 138. In another embodiments, each landline telephone jack is home run to a central location that is also coupled to the telephone adapter.

Landline telephones 146, 148, 150 and 152 are shown coupled to landline telephone jacks 138, 140, 142, and 144, respectively. A landline telephone (146, 148, 150, 152) may be a traditional, corded landline telephone, cordless landline telephone, a combination of corded and cordless landline telephones, or any other landline telephone that utilizes (directly or indirectly) landline telephone jacks or other hard-wired connection to make and receive calls. In one embodiment, landline telephones 146, 148, 150, and 152 are associated with a particular wireless telephone number, such as wireless telephone number 120. As such, the landline telephone devices coupled to high-speed data modem 132 (by virtue of the connection through telephone adapter 134) are associated with a wireless telephone number 120 that is mapped to IP address 122 in mapping 116. In other words, wireless telephone number 120 and the respective IP address 122 of high-speed data modem 132 are paired in mapping 116.

Figure 2:
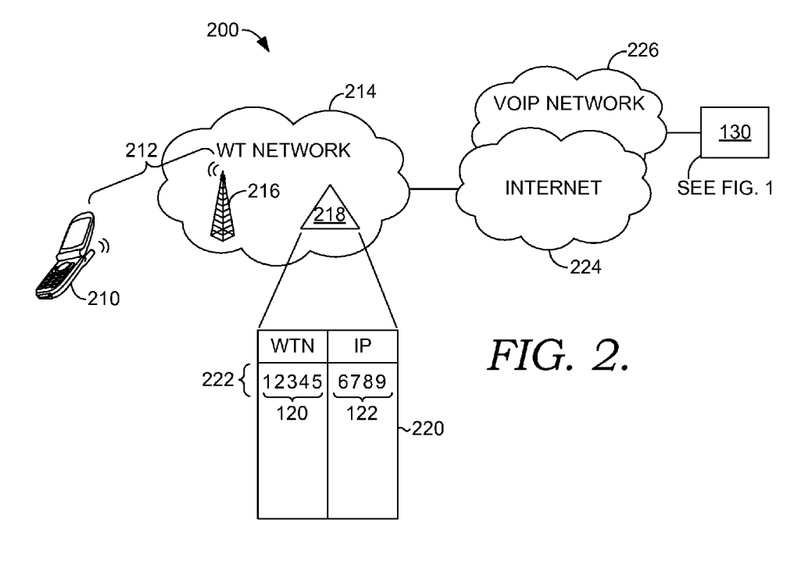

With reference to FIG. 2, operating environment 200 includes a mobile telecommunications device 210 (also referred to as a mobile device, a cell phone, a wireless telecommunications device, or a wireless device). Mobile device 210 communicates with the receiving component 216 of wireless network 214 by way of connection 212. Connection 212 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a WiFi connection to a device (e.g., mobile hotspot) that provides access to a wireless telecommunications network, such as a WLAN connection using 802.11 protocol. A long-range connection may include a connection using one or more of CDMA, GPRS, GSM, TDMA, and 802.16.

Wireless network 214 includes receiving component 216 and switch 218, and may also comprise one or more additional or alternative components that are not illustrated in FIG. 2. In one embodiment, receiving component 216 is a base station or any other device that facilitates communication between mobile device 210 and wireless network 214. As illustrated, switch 218 is part of wireless network 214 in one embodiment. As similarly discussed with reference to switch 114 in FIG. 1, although switch 218 is depicted within the wireless network 214, switch 218 might exist outside the wireless network 214, reside in the internet 224, or reside in another location in the operating environment 200.

Switch 218 provides a mapping 220 that maps wireless networks to IP addresses. For example, an exemplary mapped pair 222 is depicted with wireless telephone number 120 mapped to IP address 122. Wireless network 214 is coupled to internet 224, which is also associated with VoIP network 226. Although illustratively shown as a subset of the internet 224, in some situations, the VoIP network 226 transcends and/or extends beyond the internet 224. As such, the VoIP network 224 may be a private network, independent of the internet 224, or conversely may be integrated into the internet 224. VoIP network 226 is coupled to customer site 130 (fully described with reference to FIG. 1). As will be explained in further detail below, by virtue of the connection between wireless network 214, internet 224, VoIP network 226, and customer site 130, as well as utilizing switch 218 and mapping 220, a call may be established between mobile device 210 and a landline telephone device associated with customer site 130.

Figure 3:
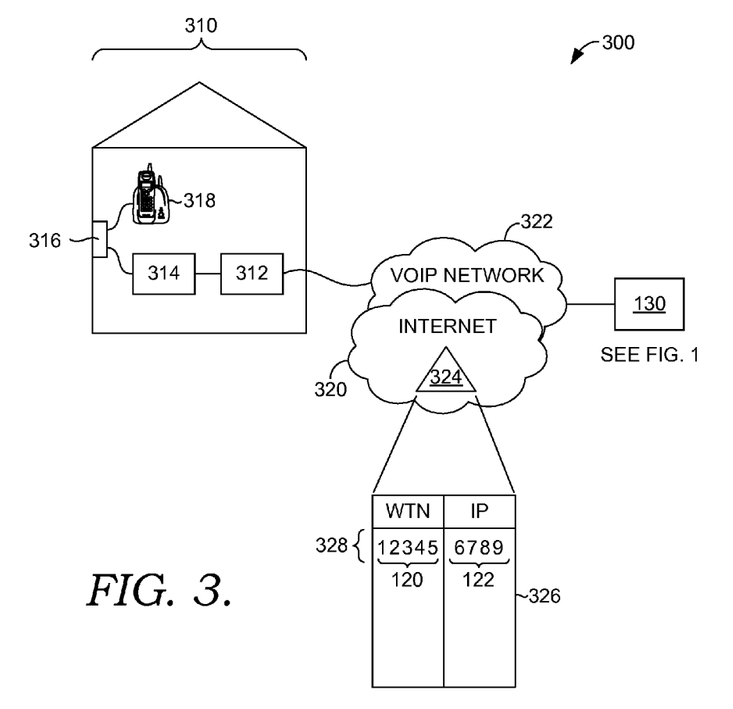

Referring now to FIG. 3, an illustrative operating environment 300 is shown to include a remote station 310 coupled to VoIP network 322, which is coupled to customer site 130. Although we refer to customer site 130 and remote station 310, we are not implying any sense of order of operation or direction of call flow when referring to the interaction between the two. Instead, customer site 130 is first described in FIG. 1 as having some components that are similar to those found in remote station 310. In other words, because they are two separate entities, the term "remote" is used to differentiate between the two, without reference to order, flow, or composition.

In one embodiment, remote station 310 includes a high-speed data modem 312 coupled to a telephone adapter 314, a landline telephone jack 316, and a landline telephone device 318. Remote station 310 can include multiple landline telephone jacks coupled to landline telephone jack 316, and multiple landline telephone devices coupled to these additional telephone jacks. Although depicted in a simplified form, high-speed data modem 312 and telephone adapter 314 may include additional components that enable remote station 310 to receive and send calls to and from landline telephone device 318.

Remote station 310 is coupled to VoIP network 322, which is also coupled to customer site 130. In the illustrated embodiment, the VoIP network 322 is depicted as a subset of the internet 320. As discussed with reference to FIGS. 1 and 2, although illustratively shown as a subset of the internet 320, VoIP network 322 may be integrated into or extend beyond internet 320. Internet 320 includes a switch 324 that provides a mapping 326 of wireless networks and IP addresses. For example, mapped pair 328 depicts wireless telephone number 120 mapped to IP address 122. As will be explained in further detail below, by virtue of the mapping of wireless telephone number 120 to IP address 122, a call may be initiated between landline telephone device 318 and a landline telephone device associated with customer site 130 using wireless telephone number 120.

Returning now to FIG. 1, in one embodiment, a request for a call from device 100 is routed through the PSTN 112, which references the mapping 116 via switch 114 to determine the destination of a call directed to wireless telephone number 120. Based on the mapped pair 118, switch 114 is able to establish a connection between device 100 and a landline telephone device associated with customer site 130 via the internet 126 and VoIP network 128.

For example, a call may be initiated by device 100 to one or more of the landline telephone devices 146, 148, 150, and 152. In one embodiment, a call that is routed through telephone adapter 134 causes all landline phones coupled to landline telephone jack 138 to ring when wireless telephone number 120 is dialed. As such, any one of landline telephone devices 146, 148, 150 and 152 may be used to answer the call from device 100. In placing such call, device 100 may dial wireless telephone number 120. Because wireless telephone number 120 is a wireless number, instead of a traditional landline (wired) telephone number, mapping 116 is utilized to associate wireless telephone number 120 with IP address 122, and therefore enable the initiation of a call to customer site 130. In one embodiment, wireless call detail records (CDRs) for the particular wireless telephone number 120 are routed to wireline billing systems where the wireless CDRs are treated as wired usage (i.e. as if the use of telephones associated with wireless telephone number 120 were incurring traditional, wired telephone charges). Additionally, a wireless telephone subscriber may establish traditional "landline" services for the landline telephones in end-user site 130 without needing to utilize a traditional landline (wired) telephone number.

In another embodiment, a service-delivery platform ("SDP") is used to generate the mapping 116 of wireless networks and IP addresses. In doing so, the SDP can establish wired features for landline telephone services that are associated with a wireless network. For example, features such as address-based 911, directory assistance, and additional telephone features traditionally associated with landline telephone services may be established for wireless telephone number 120.

Figure 4:
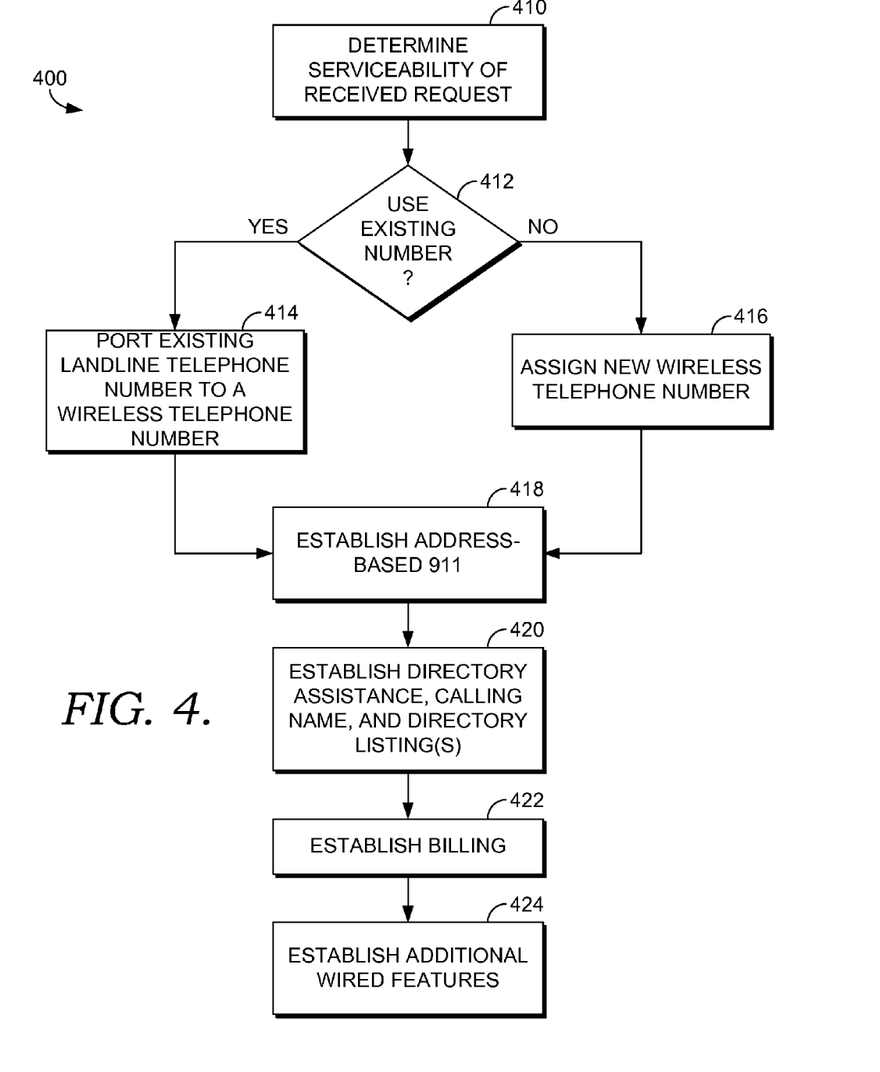
FIG. 4 depicts an illustrative method of processing a request to establish a landline telephone service for a wireless telephone subscriber according to embodiments of our technology.

Referring next to FIG. 4, an illustrative method 400 of processing a request to establish a landline telephone service for a wireless telephone subscriber is shown. At step 410, a determination of serviceability for a received request is made. This determination may include determining whether the appropriate provisions are in place to establish a landline telephone service for a particular wireless telephone subscriber. For example, a determination is made as to the identity of the requester and where the requester resides. In one embodiment, because a wireless network is used instead of a traditional landline telephone number, all locations within a wireless telephone network are "serviceable." In other embodiments, a determination of serviceability may include a determination of whether a landline telephone jack is connected to a landline telephone adapter, which is also connected to a high-speed data modem having a particular IP address, as in FIG. 1. As a result of such a determination of serviceability, as in step 416, a wireless network may be attached to an IP address in the process of establishing a landline telephone service for a wireless telephone subscriber.

At step 412, a determination is made as to whether the requester would like to utilize an existing landline (wired) telephone number as part of establishing the landline telephone service. If the determination is that the requester does wish to utilize an existing telephone number, then the existing landline telephone number is ported to a wireless telephone number at step 414. For example, a request may come from a wireless telephone subscriber that already has an existing landline telephone number, and the subscriber would like to use that particular number in the new landline telephone service. By porting the subscriber's previous landline telephone number to a wireless telephone number, the old telephone number may now be used as a wireless telephone number. In one embodiment, LEC Trading Partners (for example, RBOCs (Regional Bell Operating Companies) and LECs (Local Exchange Carriers) that provide wired and/or wireless services) are utilized to port existing wired numbers to wireless telephone numbers. If the determination at step 412 is that the user does not wish to utilize an existing telephone number, then a new wireless telephone number is assigned at step 416.

Beginning at step 418, and continuing through steps 420, 422, and 424, a number of features are established for the wireless telephone subscriber, and hence associated with the wireless network assigned to the subscriber's IP address. At step 418, address-based 911 services are established for the wireless network. Such services are not typically available for wireless telephone subscribers because there is no "address" to associate with the telephone number. However, in one embodiment, because a wireless network is attached to a subscriber's IP address, address-based 911 services are established for the wireless telephone subscriber. Such services may also be referred to as "enhanced" 911 services, which are established through the PSAP (Public Safety Answering Point or Public Safety Access Point—the local 911 provider that dispatches emergency services). In one embodiment, because a particular wireless network is attached to a particular IP address, the PSAP can provide 911 emergency services to the subscriber associated with the location of the particular IP address.

At step 420, directory-assistance services, a calling name, and directory listings are established for the wireless network used to set up the landline telephone service. In one embodiment, directory-assistance services are established by LEC Trading Partners (such as a Local Exchange Carrier) for the particular wireless telephone number. A calling name may be established by a calling name provider, which performs database lookups and then delivers calling name/calling number information. Directory listings may be established for on-line directories, telephone book directories, and the like.

At step 422, billing is established for the landline telephone service using the assigned wireless network. Such services may include billing for local telephone calls, long-distance telephone calls, access, operator assistance calls, directory assistance calls, international calls, and various other billed services provided for the wireless network used to provide landline telephone services. As shown at step 424, additional "wired" features may be established for the wireless network, including such features as call hunting, call pick-up, call transfer, voicemail, etc. Such features are traditionally only associated with "wired" landline telephone numbers. However, by virtue of the wireless network utilized to provide landline telephone services, In one embodiment, such "wired" features may be associated with a particular wireless network.

Figure 5:
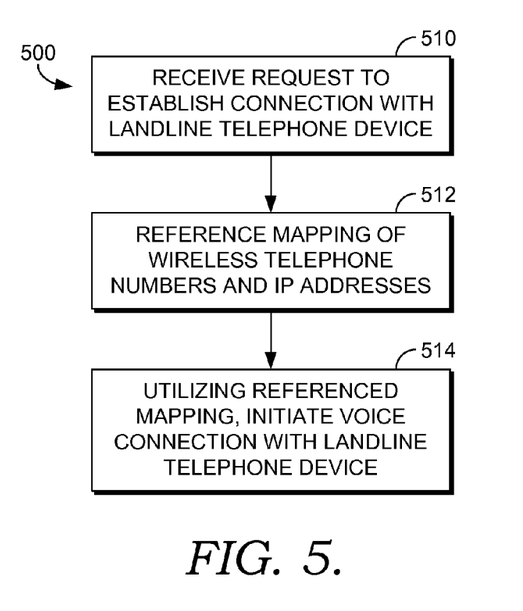
FIGS. 5-6 depict illustrative methods of initiating a voice connection with a landline telephone device using a wireless telephone number according to embodiments of our technology.
Figure 6:
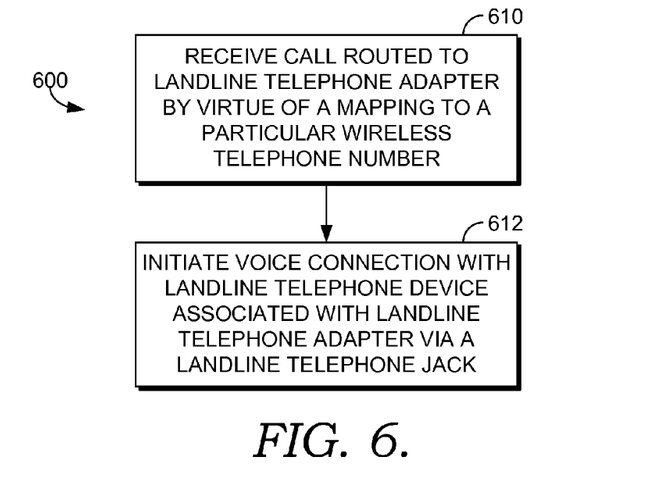

With reference finally to FIGS. 5 and 6, methods of initiating a voice connection with a landline telephone device using a wireless telephone number are illustrated. In FIG. 5, the method 500 is depicted from the perspective of a switch, such as switch 114. At step 510, a request to establish a connection with a landline telephone device is received. Because the requested landline telephone device is associated with a wireless network, at step 512, a mapping of wireless telephone numbers and IP addresses is referenced. Utilizing this referenced mapping, at step 514, a voice connection is initiated with the landline telephone device.

As shown in FIG. 6, a method 600 of initiating of a voice connection with a landline telephone device is presented from the perspective of a landline telephone adapter, such as landline telephone adapter 136. At step 610, a call is received that was routed to the landline telephone adapter by virtue of a mapping to a particular wireless telephone number. Such a mapping, as in mapping 116, associates the necessary IP address information to route the call to the landline telephone adapter. At step 612, a voice connection is initiated with the landline telephone device associated with the landline telephone adapter via a landline telephone jack. As previously discussed, a single or multiple landline telephone jacks may be associated with the landline telephone adapter, and, as such, more than one landline telephone device may ring in order to initiate such connection.

We will now provide a description of a prophetic example of an illustrative use case that is contemplated according to one embodiment of our technology. A user who is a subscriber to the services of a wireless-telecommunications network might desire to have his or her landline services also billed by wireless-telecommunications network provider (in addition to his or her wireless services). And moreover, the subscriber might live in an area where traditional landline services are unavailable. A caller 100 would initiate a call to the subscriber by dialing her phone telephone number (e.g. telephone number 120).

This wireless telephone number 120 would have been provided by the subscriber's wireless telecommunications network provider. Thus, services associated with the number could be included in the subscriber's existing wireless telephone bill. When the switch receives the call request, it is able to direct the call correctly because it has access to a mapping that that maps the target recipient's telephone number to a corresponding IP address. For example switch 114 would facilitate connecting caller 110 to the subscriber's home phone by using mapping 116. Using such mapping, the switch can connect the first party to the subscriber, even though the subscriber is utilizing a telephone number associated with the wireless-telecommunications network (provided by the provider) instead of a traditional landline telephone number. This connection would be established over the internet and/or a VoIP Network, the IP address being that of the subscribers modem 132 or other initial on-site device.

Even though the subscriber is assigned a wireless telephone number, the subscriber's landline telephones will ring when such number is dialed because of the mapping of the wireless-telephone number to the subscriber's IP address. Any of the subscriber's landline telephones (146, 148, 150, and 152) would ring.

As will be understood, the system and method described herein for initiating a telephone call to a landline telephone device associated with a particular wireless telephone number may be utilized to both send and receive telephone calls from the perspective of the landline telephone device. Simply put, the mapping of a wireless network associated with an IP address may be utilized to enables the landline telephone device(s) associated with the particular wireless network to send and receive calls.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

We claim:

1. Non-transitory computer-readable media having computer-executable instructions embodied thereon that, when executed by a computing device, facilitate a method of establishing a landline telephone call for a wireless telephone subscriber, the method comprising:

receiving a request to establish a voice connection between a first telephone device and a second telephone device, wherein the second telephone device is a landline telephone device, and further wherein a particular wireless telephone number is associated with the second telephone device;

referencing a mapping of wireless telephone numbers and corresponding IP addresses, wherein the particular wireless telephone number associated with the second telephone device is mapped to a particular IP address in the referenced mapping, wherein the referenced mapping is generated according to the following process:

receiving a request from a wireless telephone subscriber associated with the second telephone device to establish a landline telephone service:

assigning the particular wireless telephone number to the wireless telephone subscriber;

determining that a connection is established between a high-speed data modem and a landline telephone adapter associated with the landline telephone device, wherein the high-speed data modem is associated with the particular IP address, the particular IP address belonging to the wireless telephone subscriber;

determining that a connection is established between at least one landline telephone jack and the landline telephone adapter, wherein the landline telephone jack is associated with the landline telephone device; and mapping the particular wireless telephone number with the particular IP address, wherein, based on the mapping, the landline telephone device is capable of performing one or more of placing calls and receiving calls using the particular wireless telephone number; and utilizing said referenced mapping, initiating a voice connection between the first telephone device and the second telephone device.

2. The non-transitory computer-readable media of claim 1, wherein an existing wired telephone number is used as the particular wireless telephone number by porting the existing wired telephone number to the particular wireless telephone number.

3. The non-transitory computer-readable media of claim 1, wherein one or more of the following is established for the particular wireless telephone number:

address-based 911 services;
directory-assistance services;
a calling name;
directory listing services; and
billing services.

4. The non-transitory computer-readable media of claim 1, wherein one or more wired features are associated with the particular wireless telephone number, and wherein the one or more wired features comprise call hunting, call forwarding, call pick-up, and call transfer.

5. The non-transitory computer-readable media of claim 1, wherein utilizing said referenced mapping to initiate a voice connection between the first telephone device and the second telephone device includes determining which particular IP address is mapped to the particular wireless telephone number associated with the second telephone device.

6. The non-transitory computer-readable media of claim 1, wherein initiating a voice connection comprises routing wireless call detail records (CDRs) for the particular wireless telephone number to wireline billing systems, wherein the wireless CDRs are treated as wired telephone usage.

7. The non-transitory computer-readable media of claim 1, wherein the request to establish a voice connection between a first telephone device and a second telephone device is received via one or more of a public switched telephone network, a wireless telephone network, and the internet.

8. Non-transitory computer-readable media having computer-executable instructions embodied thereon that, when executed by a computing device, facilitate a method of establishing a landline telephone call for a wireless telephone subscriber, the method comprising:
receiving a call that was routed to a landline telephone adapter by virtue of a mapping to a particular wireless telephone number, wherein the mapping includes a mapped pairing of the particular wireless telephone number and a particular IP address, and further wherein the mapping is generated according to the following process:
receiving a request from the wireless telephone subscriber to establish a landline telephone service;
assigning the particular wireless telephone number to the wireless telephone subscriber;
determining that a connection is established between a high-speed data modem and the landline telephone adapter, wherein the high-speed data modem is associated with the particular IP address, the particular IP address belonging to the wireless telephone subscriber;
determining that a connection is established between the at least one landline telephone jack and the landline telephone adapter, wherein the landline telephone jack is associated with the landline telephone device;
mapping the particular wireless telephone number with the particular IP address, wherein, based on the mapping, the landline telephone device is capable of performing one or more of placing calls and receiving calls using the particular wireless telephone number; and
establishing availability of one or more of the following in connection with the particular wireless telephone number:
(1) address-based 911 services;
(2) directory-assistance services;
(3) a calling name;
(4) directory listing services;
(5) billing services; and
(6) additional wired features, wherein the additional wired features include one or more of call hunting, call forwarding, call pick-up, and call transfer; and
initiating a voice connection with a landline telephone device associated with at least one landline telephone jack coupled to the landline telephone adapter.

9. The non-transitory computer-readable media of claim 8, wherein assigning the particular wireless telephone number to the wireless telephone subscriber comprises:
determining that the wireless telephone subscriber has an existing wired telephone number, wherein the existing wired telephone number is used as the particular wireless telephone number by porting the existing wired telephone number to the particular wireless telephone number.

10. The non-transitory computer-readable media of claim 8, wherein assigning the particular wireless telephone number to the wireless telephone subscriber comprises:
assigning a new wireless telephone number as the particular wireless telephone number.

11. The non-transitory computer-readable media of claim 8, wherein wireless call detail records (CDRs) for the particular wireless telephone number are routed to wireline billing systems, wherein the wireless CDRs are treated as wired usage.

12. A system for providing landline telephone service to a wireless telephone subscriber, the system comprising:
a switch for establishing a connection between a first telecommunication device and a second telecommunication device, wherein the second telecommunication device is a landline telecommunication device, and further wherein the second telecommunication device is associated with a particular wireless telephone number, wherein said switch is coupled to an information network;
a customer site that facilitates sending and receiving landline telephone calls to and from the second telecommunication device, wherein the customer site is coupled to the information network, wherein the customer site comprises,
(1) a high-speed data modem, the high-speed data modem having a particular IP address; and
(2) a telephone adapter, wherein the telephone adapter is coupled to at least one landline telephone jack, and further wherein the at least one landline telephone jack is coupled to one or more landline telecommunication devices, one of which is the second telecommunication device; and
computer-readable media embodied with a data structure that includes a mapping of wireless telephone numbers to IP addresses, the mapping in connection with the switch,
(1) wherein the mapping comprises mapped pairs of wireless telephone numbers and IP addresses, and
(2) wherein the mapped pairs include mapping of the particular wireless telephone number to the particular IP address.

13. The system of claim 12, wherein the switch is located in a public switched telephone network, a wireless telephone network, the internet, or a VoIP network.

14. The system of claim 12, wherein the information network comprises one or more of a public switched telephone network, a wireless telephone network, the internet, and a VoIP network.

15. The system of claim 12, wherein the particular wireless telephone number is associated with at least one of the following:
address-based 911 services for the particular wireless telephone number;
directory-assistance services for the particular wireless telephone number;
a calling name for the particular wireless telephone number;

directory listing services for the particular wireless telephone number;

billing services associated with the particular wireless telephone number; and additional wired features associated with the particular wireless telephone number, wherein the additional wired features include one or more of call hunting, call forwarding, call pick-up, and call transfer.

16. The system of claim 12, wherein wireless call detail records (CDRs) for the particular wireless telephone number are routed to wireline billing systems, wherein the wireless CDRs are treated as wired usage.

17. The system of claim 12, wherein establishing a connection between the switch, information network, and customer site enables at least one of the one or more landline telephone devices to send and receive telephone calls using the particular wireless telephone number.

18. The system of claim 17, wherein enabling at least one of the one or more landline telephone devices to send telephone calls comprises:

enabling a call to be placed by at least one of the one or more landline telephone devices, wherein the call being placed is associated with the particular wireless telephone number.

19. The system of claim 17, wherein enabling at least one of the one or more landline telephone devices to receive telephone calls comprises:

enabling a call to be received by at least one of the one or more landline telephone devices when the particular wireless telephone number is dialed.

\* \* \* \* \*